(12) United States Patent
Ishiyama

(10) Patent No.: US 8,457,389 B2
(45) Date of Patent: *Jun. 4, 2013

(54) IMAGE PROCESSING DEVICE, IMAGE PROCESSING METHOD AND IMAGE PROCESSING PROGRAM

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 13/061,875

(22) PCT Filed: Sep. 2, 2009

(86) PCT No.: PCT/JP2009/065322
§ 371 (c)(1),
(2), (4) Date: Mar. 2, 2011

(87) PCT Pub. No.: WO2010/026983
PCT Pub. Date: Mar. 11, 2010

(65) Prior Publication Data
US 2011/0164811 A1  Jul. 7, 2011

(30) Foreign Application Priority Data

Sep. 3, 2008 (JP) .................................. 2008-226002

(51) Int. Cl.
*G06K 9/00* (2006.01)
*G06T 15/00* (2006.01)
*G06T 15/50* (2006.01)

(52) U.S. Cl.
USPC ............ 382/154; 382/118; 345/419; 345/426

(58) Field of Classification Search
USPC ........................... 382/118, 154; 345/419, 426
See application file for complete search history.

(56) References Cited

U.S. PATENT DOCUMENTS 7,319,467 B2    1/2008   Weyrich et al.
7,321,370 B2 *  1/2008   Ishiyama ...................... 345/582
(Continued)

FOREIGN PATENT DOCUMENTS

JP   2002-24830 A    1/2002
JP   2006-277748 A   10/2006
(Continued)

OTHER PUBLICATIONS

Tomoaki Higo et al., Buttai no Zentai Keijo to Hansha parameter no Doji Suitei, Image Lab, vol. 18, No. 11, Nov. 2007, pp. 31-36.

(Continued)

*Primary Examiner* — Anand Bhatnagar
*Assistant Examiner* — Soo Park
(74) *Attorney, Agent, or Firm* — Foley & Lardner LLP

(57) ABSTRACT

An image processing device calculates, from a registration image representing a photographed object and three-dimensional shape data in which respective points of a three-dimensional shape of the object are correlated with pixels of the registration image, by assuming uniform albedo, a shadow base vector group having components from which an image under an arbitrary illumination condition can be generated through linear combination. A shadow in the registration image is estimated with using the vector group. A perfect diffuse component image including the shadow is generated, and based on the image a highlight removal image is generated in which a specular reflection component is removed from the registration image. Thus, an image recognition system generates illumination base vectors from the highlight removal image and thereby can obtain the illumination base vectors based on which an accurate image recognition process can be carried out without influence of a specular reflection.

16 Claims, 10 Drawing Sheets

U.S. PATENT DOCUMENTS

| | | | |
|---|---|---|---|
| 7,593,019 B2 * | 9/2009 | Ishiyama | 345/582 |
| 7,679,621 B2 | 3/2010 | Nishiyama et al. | |
| 7,710,431 B2 * | 5/2010 | Ishiyama | 345/582 |
| 7,853,082 B2 | 12/2010 | Shimano et al. | |
| 7,932,913 B2 * | 4/2011 | Ishiyama | 345/582 |
| 2009/0226029 A1 * | 9/2009 | Shimano et al. | 382/100 |

FOREIGN PATENT DOCUMENTS

| | | |
|---|---|---|
| JP | 2007-72814 A | 3/2007 |
| WO | WO 2006/049237 A1 | 5/2006 |

OTHER PUBLICATIONS

Athinodoroa S. Georghiades et al., From Few to Many: Generative Models for Recognition Under Variable Pose and Illumination, Proceedings Fourth IEEE International Conference, 2000, pp. 277-284.

Rui Ishiyama et al., Absolute Phase Measurements Using Geometric Contraints Between Multiple Cameras and Projectors, Applied Optics, vol. 46, No. 17, Jun. 2007, pp. 3528-3538.

Paul Debevec et al., Acquiring the Reflectance Field of a Human Face, SIGGRAPH 2000 Conference Proceedings, 2000, pp. 145-156.

Rui Ishiyama et al., An Appearance Model Constructed on 3-D Surface for Robust Face Recognition Against Pose and Illumination Variations, IEEE Transactions on Systems, Man and Cybernetics-Part C: application and Reviews, vol. 35, No. 3, Aug. 2005, pp. 326-334.

Ronen Basri et al, Lambertian Reflectance and Linear Subspaces, IEEE Transactions on Pattern Analysis and Machine Intelligence, vol. 25, No. 2, Feb. 2003, pp. 218-233.

Hitoshi Imaoka et al., Face Recognition Algorithm Using Linear Discriminant Analysis and Perturbated Facial Image Method, Proceedings of $4^{th}$ Forum on Information Technology, 2005, 2 pages.

Rui Ishiyama et al., Fast and Accurate Facial Pose Estimation by Aligning a 3D Appearance Model, Proceedings of the $17^{th}$ International Conference on Pattern Recognition (ICPR '04), Aug. 2004, 4 pages.

Kenichi Kanatani, Understandable Mathematical Optimization, Kyouritu Publication, Sep. 2005, pp. 136-130.

Rui Ishiyama et al., Face Recognition Under Variable Pose and Illumination Conditions Using 3D Facial Appearance Models, IEIEC, D-11, vol. J88, No. 10, 2005, pp. 2069-2080.

* cited by examiner

Fig. 5
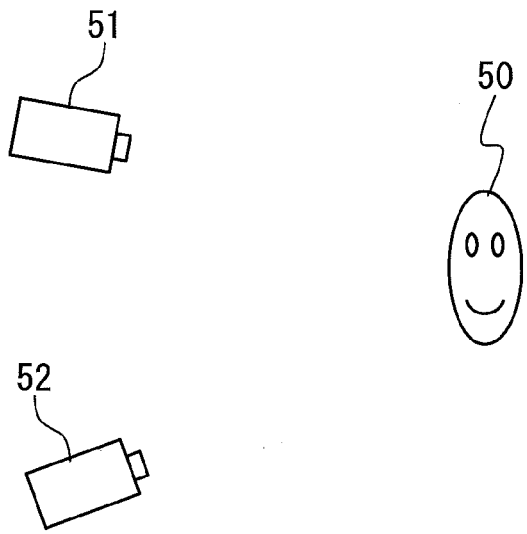
Fig. 6A
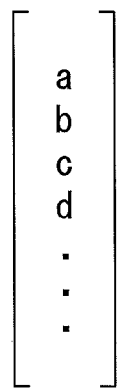
Fig. 6B
| a | b | c | d | .. | .. | | |
|---|---|---|---|---|---|---|---|
| | | | | | | | |
| | | | | | | | |
.
.

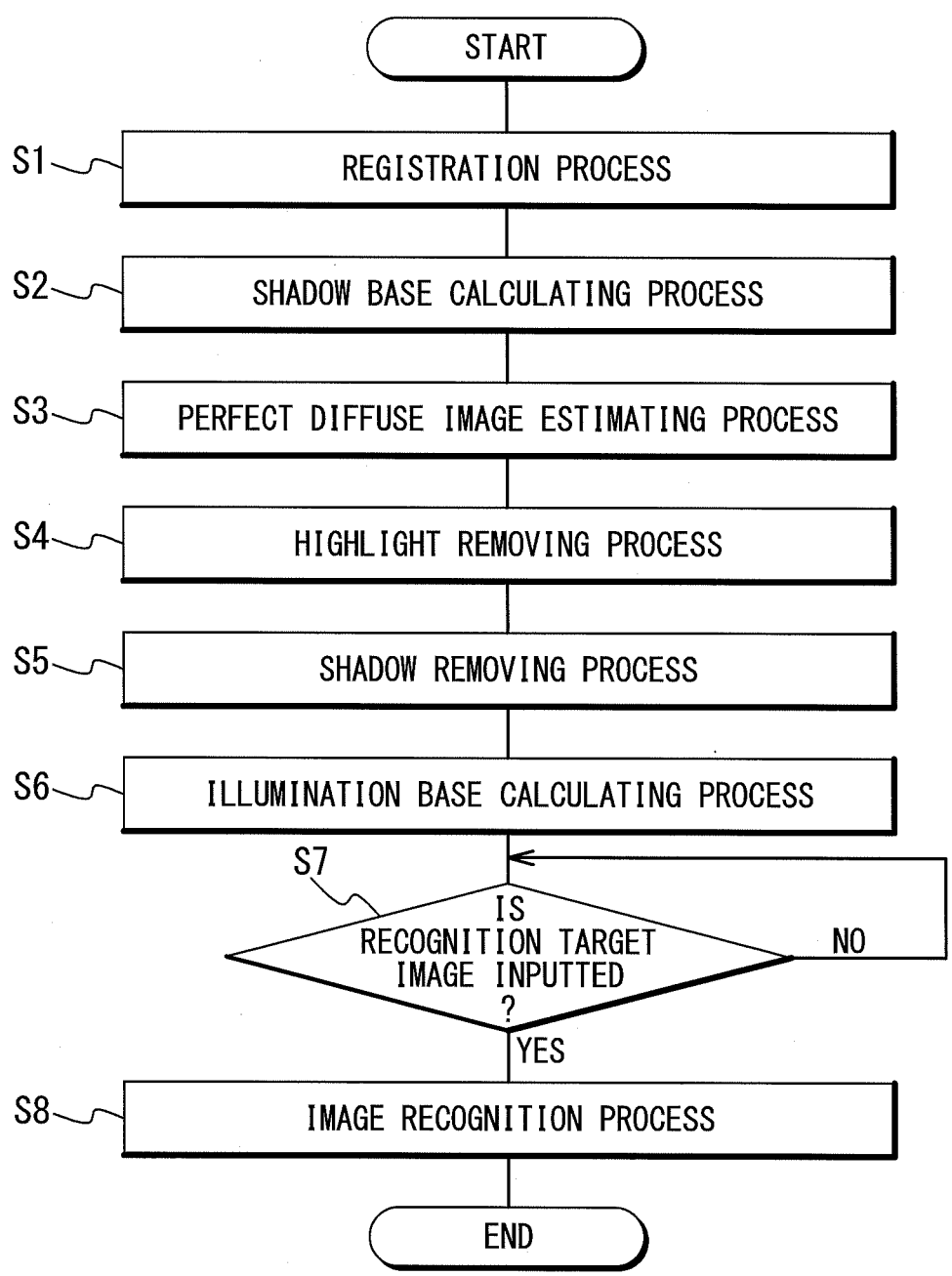

IMAGE PROCESSING DEVICE, IMAGE PROCESSING METHOD AND IMAGE PROCESSING PROGRAM

TECHNICAL FIELD

The present invention relates to an image processing device, an image processing method and an image processing program applied to an image recognition system which identifies an object in an image or recognizes a state such as position and attitude of the object.

BACKGROUND ART

There are proposed various techniques for use in face image recognition by a computer. The face image recognition is applied to, for example, an image recognition system. The image recognition system identifies an object in an image or recognizes a state such as position and attitude of the object. Since the image recognition system is a general technique, the explanation for the system is omitted.

For example, Non-Patent Literature 1 describes a technique of generating various images of a photographed object, in which orientation or illumination is varied. In the technique described in Non-Patent Literature 1, a three-dimensional shape of the photographed object is measured so as to synthesize the images of the photographed object, in which orientation or illumination is varied.

Also, Non-Patent Literature 2 describes a technique of measuring highly accurate data of a three-dimensional shape as handy as a usual photographing.

Also, there are proposed various techniques for rendering a human face image at high accuracy. In order to synthesize realistic images of a face, an accurate skin reflectance model of a human face is required. However, a skin reflectance is different according to, e.g., an age, race and sex. Further, since a skin reflectance changes according to whether a skin is warm or cold, dry or wet and the like even in the same person, the skin reflectance changes in a day. In particular, a specular reflection component of a skin surface is largely changed by an influence of these environments and is also largely changed by a viewpoint (photographing direction) of a camera that photographs an image. In a biomedical field, cosmetic field, computer vision field and the like, there are proposed a lot of models on which characteristics of human skin are reflected (see, for example, Patent Literature 1 and Non-Patent Literature 3). As one example of these techniques, there is a technique using an analytical BRDF (Bidirectional Reflectance Distribution Function) for a skin reflectance model. More complicated a model is, the number of parameters of the model increases, a larger number of images are required to generate the model, and a computation amount increases.

However, when personal identification based on a face image is intended, it is not necessarily required to reproduce fine shadows that provide excellent reality and texture in view of human eyes. Moreover, since it is impossible to know in advance an environment in which an image as a recognition target is photographed and a state of a photographed object at that time, even a fine model using a lot of parameters cannot reproduce an image suitable for a recognition target image as a recognition target. Because of these reasons, when face image recognition is intended, it has been considered sufficient to use a perfect diffuse model (Lambertian model) in place of a skin reflection. In the perfect diffuse model, only reflectance (albedo) which is not dependent on a viewpoint of a camera nor a lighting direction is a parameter. Although it is difficult to measure albedo by easy means, an image with less shadow, which is photographed under a uniform illumination, can be used in place of albedo. That is, if a photograph such as a general certification photograph, which is photographed in an environment approximate to a uniform illumination condition, is given as a registration image to be prepared in advance, the registration image can be used in place of albedo. When such approximation is used, it is possible to synthesize face images in various illumination conditions by using the measured three-dimensional shape and the registration image.

Non-Patent Literature 4 describes a technique for reproducing shadows or cast shadows under arbitrary attitudes and illumination conditions by only calculating illumination base vectors which linearly approximate a image group and storing at most nine illumination base vectors.

By using the registration image in place of the albedo according to these techniques, when a piece of face image (registration image) and three-dimensional shape data are given, it is possible to generate an illumination model from these data. Then, it is possible to realize a personal identification system robust to environmental variation by reproducing a face image under an arbitrary attitude and illumination condition based on the illumination model and matching the reproduced image and a recognition target image.

The illumination model represents images with shadows corresponding to various illumination arrangements. For example, by using a sum of results of multiplying a plurality of illumination base vectors by respective coefficients, a various-shadow image of a photographed object lighted from various directions can be represented. In this case, a formula to calculate the sum of results of multiplying the plurality of illumination base vectors by the respective coefficients and the illumination base vectors correspond to an illumination model. The illumination base vectors described in Non-Patent Literature 4 also correspond to an illumination model. FIG. 1 schematically shows illumination base vectors. For example, it is assumed that illumination base vectors $G_0$, $G_1$, $G_2$, . . . are obtained from a registration image and three-dimensional shape data of a photographed object. It is noted that the registration image can be represented as a vector of which components are brightness values of respective pixels of the registration image. Also, vector components of the illumination base vector are brightness values of respective pixels of an image corresponding to the illumination base vector, respectively. A various-shadow image of a photographed object lighted from various directions is represented as a sum ($\lambda' \cdot G_0 + \lambda'' \cdot G_1 + \ldots$) of results of multiplying the illumination base vectors by respective coefficients.

A calculating method of the illumination base vector is also described in, for example, Non-Patent Literature 5.

Non-Patent Literature 6 describes a technique that improves recognition performance by generating images in which illumination or attitude is changed, as learning data with using an average three-dimensional shape even when a three-dimensional shape cannot be measured or when a face image under a uniform illumination condition cannot be photographed.

Furthermore, Non-Patent Literature 7 describes a process in which each point of a three-dimensional shape is correlated with a pixel in a registration image.

Furthermore, Non-Patent Literature 8 describes a generalized inverse matrix.

In face image recognition with use of a computer, since a photographed face image largely varies according to an orientation of a face as a recognition target or an illumination condition when the face is photographed, recognition accuracy is lowered. Therefore, although a highly accurate recognition is possible when a face image is photographed under the condition that a face is oriented frontward, the face is uniformly lighted so as not to produce shadows on the face and the like, it is difficult to carry out recognition with the use of a face image which is photographed in an arbitrary environment.

When a human looks a face image to carry out a personal identification, he or she can easily distinguish a brightness variation (brightness variation due to contours of features of the face or the like) based on features of a face itself effective for a personal discrimination from a brightness variation (attitude variation, shadows, highlight or the like) caused by a photography environment (an orientation of a camera with respect to a photographed object, illumination arrangement state, internal state of the photographed object or the like). However, a computer cannot easily distinguish the brightness variation based on the features of face from the brightness variation based on the photography environment, and thus, the computer may fail to recognize a face when the latter brightness variation due to environmental factors is same level as the former brightness variation (brightness variation due to personal features).

In order to make a computer distinguish the brightness variation based on personal features from the brightness variation due to photography environment to thereby recognize a face image with effectively using the former, there may be considered a method in which images under various environments are collected to determine a discrimination criterion for face images with using a technique of a machine learning. However, wide variety of environmental factors have influences on the brightness, and thus, it is difficult to collect all learning data covering the respective environmental conditions. For example, it is necessary not only to photograph a face in various orientations while changing a visual axis (orientation) of a camera with respect to the face as a photographed object but also, with respect to illumination, to prepare a lot of lighting equipments so as to photograph the face under various illumination conditions. In particular, in a case that a photographed object is a creature as in a case of face recognition or the like, a large number of images are required. Thus, it has been difficult to comprehensively collect images under various environmental conditions, because of high cost and heavy load to a photographed object.

According to the technique described in Non-Patent Literature 1, although it is possible to generate various images of a photographed object, in which orientation or illumination is changed, it is demanded to easily (i.e., without applying load to a photographed object and at low cost) obtain highly accurate three-dimensional model and illumination model. The technique described in Non-Patent Literature 2 can be used to measure a three-dimensional shape. The technique described in Non-Patent literature 3 can be used to obtain an illumination base vector group as an illumination model.

However, if there is a specular reflection component in a registration image prepared in advance for face verification, the specular reflection component will be reflected on illumination base vectors generated from the registration image. It is noted that a specular reflection is so-called a "luster". If the specular reflection component is reflected on the illumination base vectors, a specular reflection appears in a shadow image obtained from the illumination base vectors and deteriorates recognition accuracy in matching between the registration image and a recognition-target image. FIG. 2 shows examples of illumination base vectors when there is a specular reflection component in a registration image. When there is a specular reflection 100 in a registration image, specular reflection components 100*a*, 100*b* and 100*c* and the like appear in the illumination base vectors obtained from the registration image. Then, a specular reflection in addition to shadows appears in a shadow image calculated from these illumination base vectors. Since the specular reflection component varies depending on a condition of skin of a person as a photographed object and an influence due to temperature and humidity at a place of photographing, it is difficult to completely suppress the specular reflection component in the registration image.

Furthermore, although the registration image is photographed with the photographed object being lighted as uniformly as possible so as not to produce shadows, even in such case, shadows may be appear in the registration image.

When an illumination model is generated from a registration image in which a specular reflection component or a shadow appears, a specular reflection component or the like appears in the illumination model and deteriorates recognition accuracy in matching between the registration image and a recognition-target image.

CITATION LIST

Patent literature

Patent Literature 1: Japanese patent publication (JP-P2006-277748A)

Non Patent Literature

Non-Patent Literature 1: Athinodoros S. Georghiades, Peter N. Belhumeur, David J. Kriegman, "From Few to Many: Generative Models for Recognition Under Variable Pose and Illumination", Automatic Face and Gesture Recognition, 2000. Proceedings Fourth IEEE International Conference, p. 277-284, 2000

Non-Patent Literature 2: Rui Ishiyama, Shizuo Sakamoto, Johji Tajima, Takayuki Okatani Koichiro Deguchi, "Absolute phase measurements using geometric constraints between multiple cameras and projectors", Optical Society of America, APPLIED OPTICS Vol. 47, No. 17, June, 2007

Non-Patent Literature 3: Paul Debevec, Tim Hawkins, Chris Tchou, Haarm-Pieter Duiker, Westley Sarokin, "Acquiring the Reflectance Field of a Human Face", Computer Graphics, SIGGRAPH 2000 Proceedings, p. 145-156, 2000

Non-Patent Literature 4: Rui Ishiyama, Masahiko Hamanaka, Shizuo Sakamoto, "An Appearance Model Constructed on 3-D Surface for Robust Face Recognition Against Pose and Illumination Variations", IEEE TRANSACTIONS ON SYSTEMS, MAN, AND CYBERNETICS—PART C: APPLICATIONS AND REVIEWS, VOL. 35, NO. 3, August, 2005

Non-Patent Literature 5: Ronen Basri, David W. Jacobs, "Lambertian Reflectance and Linear Subspaces", IEEE TRANSACTIONS ON PATTERN ANALYSIS AND MACHINE INTELLIGENCE, VOL. 25, NO. 2, IEEE Computer Society, February, 2003

Non-Patent Literature 6: Hitoshi Imaoka, Atsushi Sato, "Face Recognition Algorithm Using Linear Discriminant Analysis and Perturbed Subspace Method", Proceedings of 4th Forum on Information Technology, 2005

Non-Patent Literature 7: Rui Ishiyama, Shizuo Sakamoto, "Fast and Accurate Facial Pose Estimation by Aligning a 3D Appearance Model", Proceedings of the 17th International Conference on Pattern Recognition (ICPR '04), August, 2004

Non-Patent Literature 8: Kenichi Kanatani, "Understandable Mathematical Optimization", Kyouritu Publication, p. 126-130

SUMMARY OF INVENTION

As described above, there is a problem that, when an illumination model is generated from a registration image in which a specular reflection component or a shadow appears, a specular reflection component or the like appears in the illumination model and deteriorates recognition accuracy in matching between the registration image and a recognition target image. Therefore, an object of the present invention is to provide an image processing device, an image processing method and an image processing program capable of generating an image for generating an illumination model that improves a recognition performance of an image recognition system.

An image processing device according to the present invention includes a shadow base calculating unit, a perfect diffuse image estimating unit and a highlight removing unit. The shadow base calculating unit calculates, from a registration image representing a photographed object and three-dimensional shape data in which respective points of a three-dimensional shape of the photographed object are correlated with pixels of the registration image, by assuming uniform albedo, a shadow base vector group having components as vector values from which an image under an arbitrary illumination condition can be generated through a linear combination. The perfect diffuse image estimating unit estimates a shadow in the registration image with using the shadow base vector group and generates a perfect diffuse component image as an image including the shadow. The highlight removal unit generates, based on the perfect diffuse component image, a highlight removal image in which a specular reflection component is removed from the registration image. Thus, an image recognition system generates illumination base vectors from the highlight removal image and thereby can obtain the illumination base vectors based on which an accurate image recognition process can be carried out without influence of a specular reflection.

BRIEF DESCRIPTION OF DRAWINGS

The above objects, advantages, and features of the present invention will be more apparent from the description of embodiments taken in conjunction with the accompanying drawings, in which:

FIG. 5 shows a configuration of a system for acquiring a registration image and three-dimensional shape data;

FIG. 6A is a diagram for explaining vector components of an illumination base vector and shows an illumination base vector;

FIG. 6B is a diagram for explaining vector components of an illumination base vector and shows an image corresponding to the illumination base vector of FIG. 6A;

FIG. 12 is a flow chart showing an operation of the image processing device according to the fourth embodiment of the present invention.

DESCRIPTION OF EMBODIMENTS

With respect to a face image used in face image recognition, the following assumptions are generally valid. First, contours of eyes, eyebrows and the like, which are effective for personal identification, are photographed to have darker brightness values than that of skin surrounding those. Second, contour regions of eyes, eyebrows and the like occupy very small area in a whole face. Third, albedo is almost uniform in skin regions other than portions surrounded by such contours. Fourth, a specular reflection component is brighter than the brightness value of the surrounding skin and an area of a region in which the specular reflection appears is small. Based on the above knowledge, the inventor has made the invention described below.

Referring to the attached drawings, an image processing device according to embodiments of the present invention will be described below in detail.

(First Embodiment)

Figure 1:
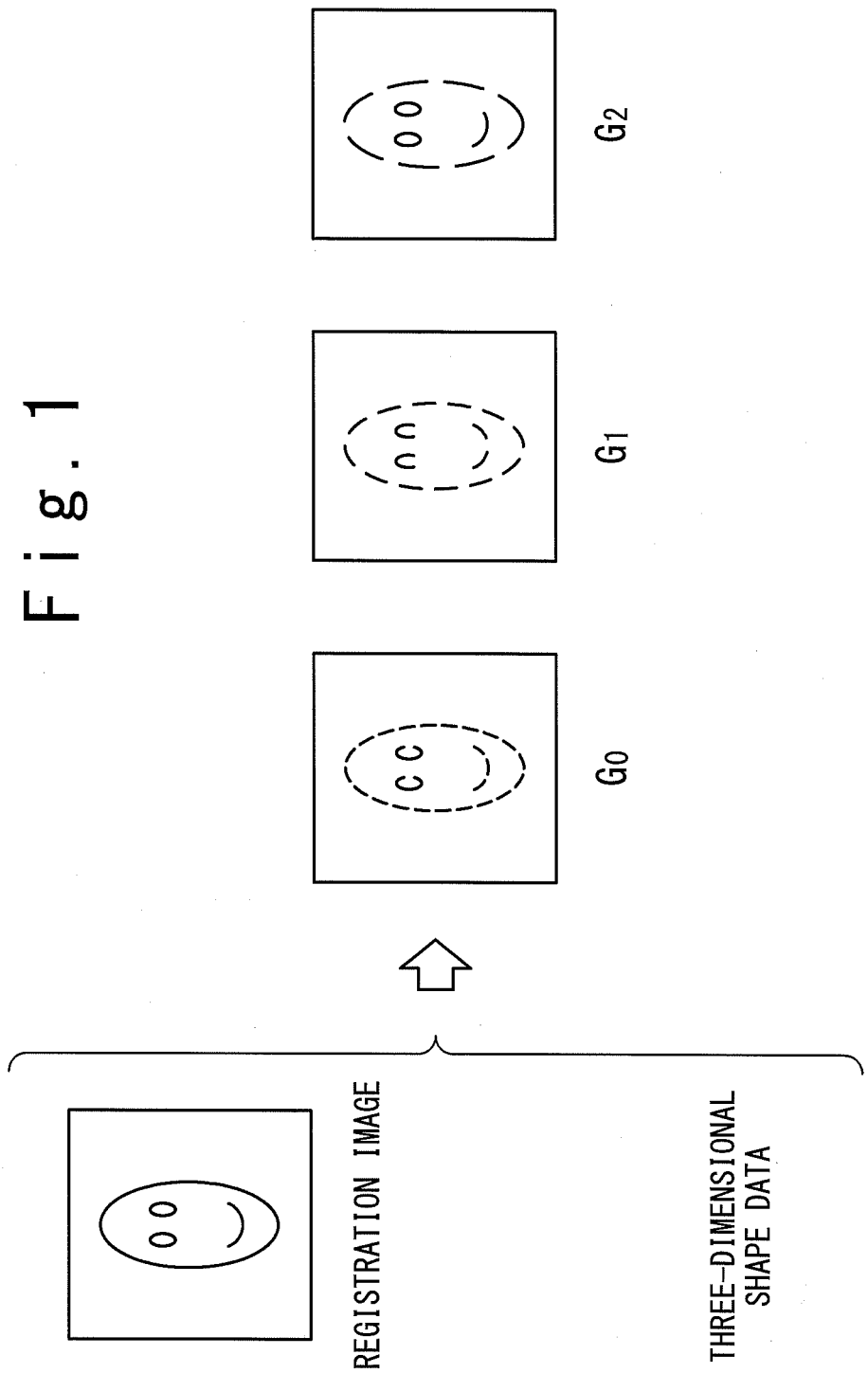
FIG. 1 schematically shows illumination base vectors.
Figure 2:
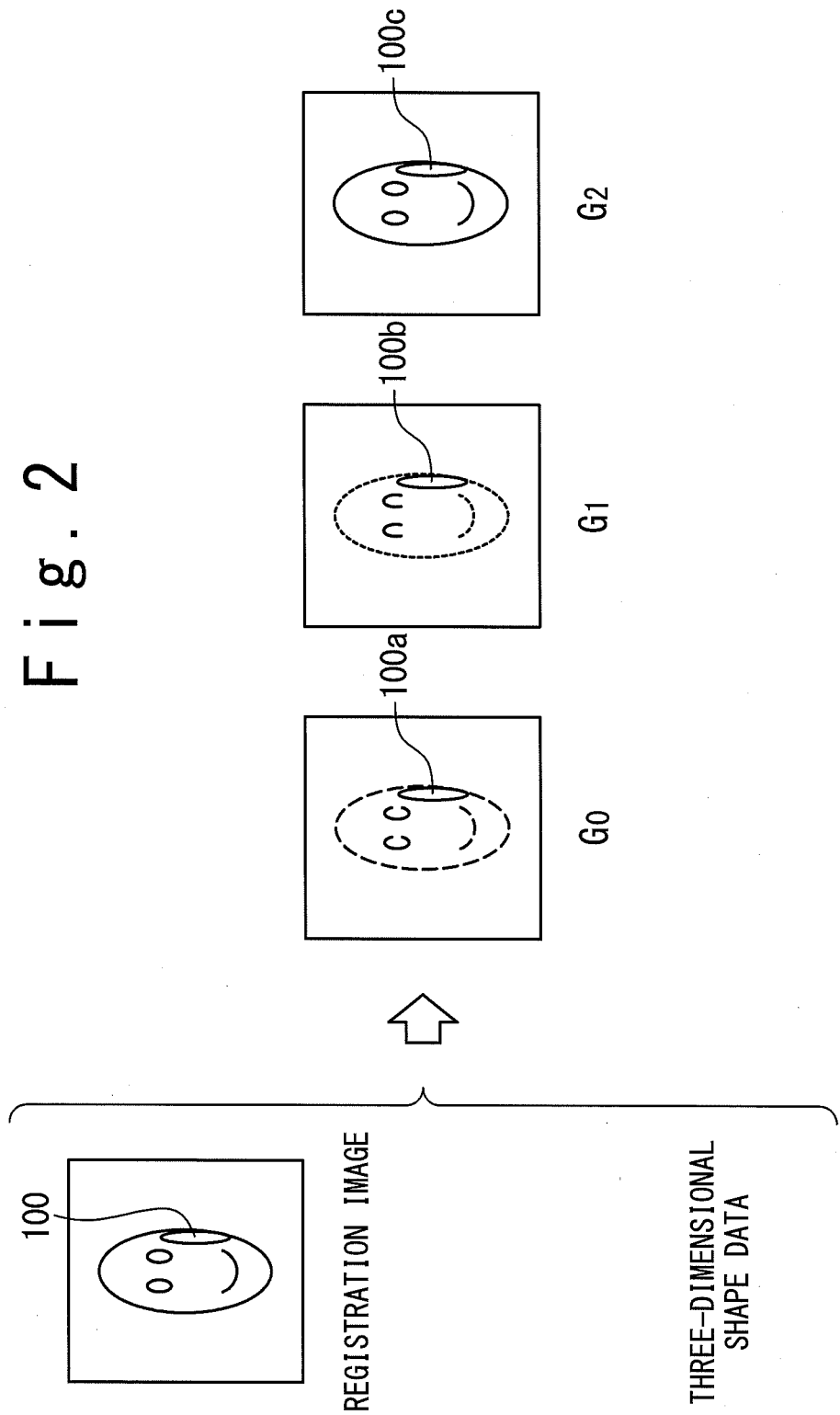
FIG. 2 shows illumination base vectors in a case that there is a specular reflection component in a registration image.
Figure 3:
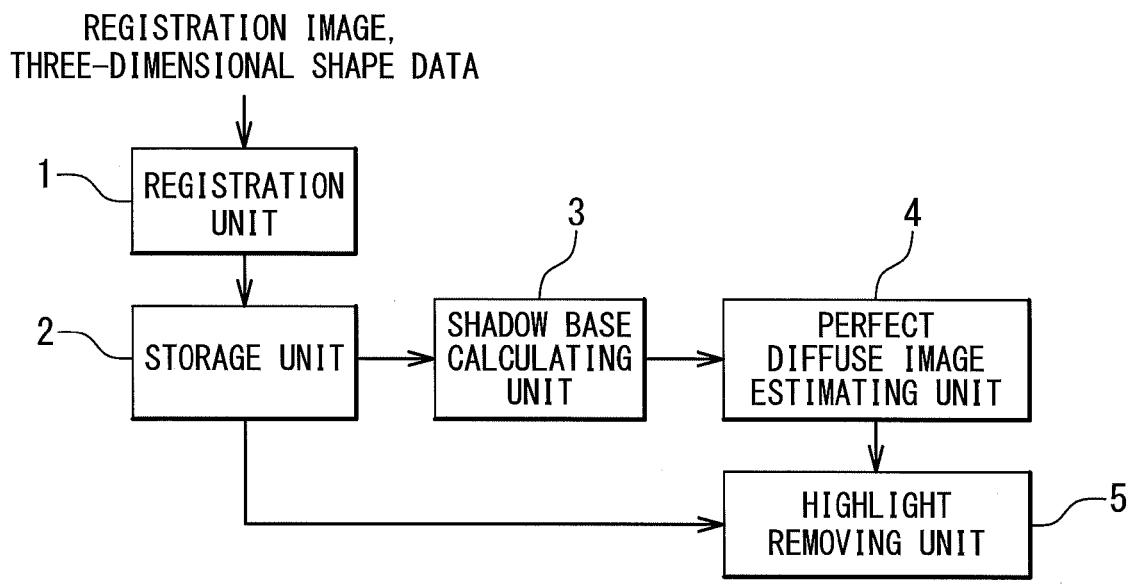
FIG. 3 is a block diagram showing a configuration of an image processing device according to a first embodiment of the present invention.

FIG. 3 is a block diagram showing a configuration of an image processing device according to a first embodiment of the present invention. The image processing device according to the first embodiment of the present invention generates an image in which a specular reflection component is removed from a registration image for generating an illumination model. The image processing device includes a registration unit 1, a storage unit 2, a shadow base calculating unit 3, a perfect diffuse image estimating unit 4 and a highlight removing unit 5.

When a registration image representing a photographed object and three-dimensional shape data in which each point of a three-dimensional shape of the photographed object is correlated with a pixel of the registration image are inputted, the registration unit 1 stores the registration image and the three-dimensional shape data in the storage unit 2. The registration image is an image photographed by lighting the photographed object as uniformly as possible so as to reduce shadows. It is provided here that the photographed object is a human and the registration image represents a face of the human. The registration image is used for image recognition and is prepared in advance. The three-dimensional shape data represents coordinate values of respective points of the human face (three-dimensional shape of the photographed object) represented by the registration image and is prepared in advance.

The shadow base calculating unit 3 calculates illumination base vectors from the registration image and the three-dimensional shape data stored in the storage unit 2. These illumination base vectors are referred to as shadow base vectors, hereinafter.

The perfect diffuse image estimating unit 4 estimates a shadow in the registration image by using the shadow base vectors and generates an image, which includes the shadow, as a perfect diffuse component image.

The highlight removing unit 5 compares the registration image and the perfect diffuse component image, determines a specular reflection region, in which a specular reflection appears, in the registration image, and replaces a brightness value of the specular reflection region with a brightness value of a region, which corresponds to the specular reflection region, in the perfect diffuse component image. As a result, the brightness value of the specular reflection region of the registration image is replaced and an image not including the specular reflection component is generated.

The registration unit 1, the shadow base calculating unit 3, the perfect diffuse image estimating unit 4 and the highlight removing unit 5 can be implemented as either circuits or a computer program. For example, in the case of hardware, the registration unit 1, the shadow base calculating unit 3, the perfect diffuse image estimating unit 4 and the highlight removing unit 5 are circuits or devices. For example, in the case of software, the registration unit 1, the shadow base calculating unit 3, the perfect diffuse image estimating unit 4 and the highlight removing unit 5 are a computer program. In this case, the image processing device according to the first embodiment of the present invention is a computer which includes an execution unit (not shown) as a CPU (Central Processing Unit) and the storage unit 2 as a recording medium. The storage unit 2 stores a computer program (image processing program) to be executed by the computer. When the computer is activated, the execution unit reads the computer program from the storage unit 2 and executes the program.

Figure 4:
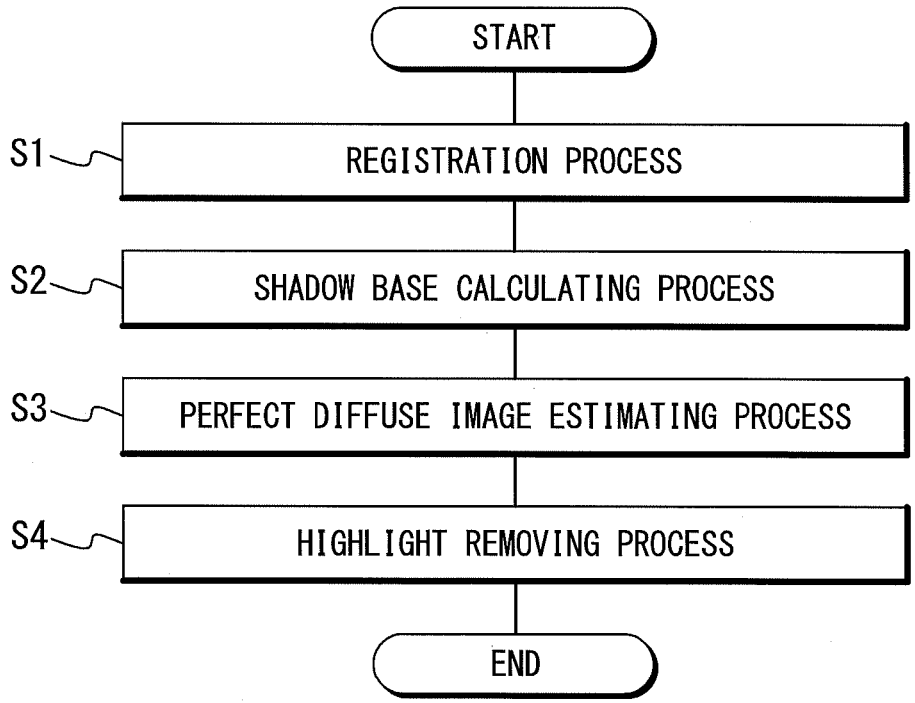
FIG. 4 is a flow chart showing an operation of the image processing device according to the first embodiment of the present invention.

Next, operations are described. FIG. 4 is a flow chart showing an operation of the image processing device according to the first embodiment of the present invention.

When an image (registration image) of a face photographed in uniform lighting and three-dimensional shape data of the face are inputted to the registration unit 1, the registration unit 1 stores the registration image and the three-dimensional shape data in the storage unit 2 (Step S1). It is noted that the three-dimensional shape data represents a three-dimensional shape of the photographed object of the registration image; however, the three-dimensional shape data may represent an average shape of the photographed object of the registration image. For example, three-dimensional shape data representing a shape of an average face may be inputted.

The registration image and the three-dimensional shape data inputted in Step S1 can be acquired by a method described in Non-Patent Literature 2, for example. FIG. 5 shows a configuration of a system which acquires the registration image and the three-dimensional shape data. When the registration image and the three-dimensional shape data are measured, a projector 52 and a camera 57 are directed toward a face 50. The camera 57 photographs the face 50 and measures a three-dimensional shape of the face 50. The camera 51 photographs the face 50 to generate the registration image in a condition that the whole of the face 50 is lighted as uniformly as possible. Furthermore, the projector 52 projects a stripe pattern onto the face 50. Straight lines of the stripe pattern are distorted when projected onto the face 50 with concave and convex, and thus, a distorted stripe pattern appears on the face 50. The camera 51 photographs the distorted stripe pattern on the face, which is projected from a direction other than that of the camera 51, and calculates coordinates values of respective points of the face based on a degree of deformation of the stripe pattern and a positional relation among the camera 51, the projector 52 and the face 50. Then, the camera 51 correlates the respective points of the face 50 and pixels of the registration image. Since the camera 51 generates the registration image of the face 50 and calculates the three-dimensional shape data of the face 50 at the completely same position, respective points of the face 50 can be correlated with pixels of the registration image. It is noted that, a method of generating the registration image and the three-dimensional shape data in which a correlation relation between the respective points of the three-dimensional shape and pixels of the registration image is defined, is not limited to the method mentioned above.

Alternatively, when the photographing of the registration image and the measurement of the three-dimensional measurement data are separately executed, the registration unit 1 may define the correlation relation between the respective points of the three-dimensional shape and pixels of the registration image and store the registration image and the three-dimensional shape data in the storage unit 2. This correlation process may be carried out by a method described in Non-Patent Literature 7. For example, based on the three-dimensional shape data, the registration unit 1 generates an image observed from a view point which is determined with respect to a three-dimensional shape indicated by the three-dimensional shape data and compares the image observed from the view point with the registration image. The registration unit 1 repeats this process to determine a view point for which a difference between the observed image and the registration image is smallest. Then, the registration unit 1 correlates respective points of the three-dimensional shape observed from the view point with pixels of the registration image corresponding to the respective points. When the three-dimensional measurement data is three dimensional shape data representing an average shape of the photographed object (face), not only the view point but also the shape indicated by the three-dimensional measurement data is altered in the above repeated process. Then, a view point and a three-dimensional shape are determined for which a difference between the observed image and the registration image is smallest, and respective points of the three-dimensional shape observed from the view point is correlated with pixels of the registration image corresponding to the respective points. It is noted that this method is merely described as an example and another method can be used to the process of correlating respective points of the three-dimensional shape with pixels of the registration image.

Next, the shadow base calculating unit 3 calculates, by assuming albedo is uniform at 1.0, from the registration image and the three-dimensional shape data, a shadow base vector group having components as vector values from which an image under an arbitrary illumination condition can be generated through a linear combination (Step S2). The shadow base vector group can be calculated by a method described in Non-Patent Literature 5, for example. Although the number of shadow base vectors is arbitrary, nine shadow base vectors can be calculated as the shadow base vector group by the method described in Non-Patent Literature 5.

Here, vector components of the illumination base vector are described. FIGS. 6A and 6B are drawings for explaining the vector components of the illumination base vector. FIG. 6A shows the illumination base vector. The number of the vector components of the illumination base vector is same as the number of the pixels of the registration image. Then, a vector component of the illumination base vector is a brightness value of the corresponding pixel. Hence, one illumination base vector represents an image (which includes the same number of pixels as those of the registration image) shown in FIG. 6B. Since the shadow base vector is an illumination base vector, each shadow base vector also represents an image including the same number of pixels as those of the registration image.

Here, an example is described in which nine kinds of shadow base vectors (shadow base vector group) are calculated by the method described in Non-Patent Literature 5. The respective shadow base vectors are denoted by $G_0$ to $G_8$.

It is assumed that a pixel of the image, which corresponds to each vector component of the shadow base vector, is denoted by pi, and a normal vector at a point on the three-dimensional shape indicated by the three-dimensional shape data, the point corresponding to pi, is denoted by $n_i$. And vector components of the normal vector $n_i$ is denoted by (x, y, z), that is, $n_i$=(x, y, z). This (x, y, z) is not coordinate values at the point on the three-dimensional shape but the normal vector.

At this time, it is assumed that the vector component corresponding to pi is denoted by bnm (pi). The shadow base calculating unit 3 calculates vector components of respective shadow base vectors by using Formula (1) shown below:

$$bnm(pi) = pi \cdot rnm(n_i) \qquad \text{Formula (1)}$$

Here, ρi is albedo (reflectance) at pi, and albedo is uniformly assumed to be 1.0.

Although rnm ($n_i$) on the left side of Formula (1) is a value represented by Formula (2) shown below, the calculation is different from one to another of $G_0$ to $G_8$.

$$rnm(n_i) = \alpha_n \cdot Y_{nm} \qquad \text{Formula (2)}$$

Herein, $\alpha_n$ is a value represented by Formula (3) as below:

$$\alpha_n = \sqrt{\frac{4\pi}{2n+1}} \cdot k_n \qquad \text{Formula (3)}$$

However, "n" shown without a subscript means a number of a shadow base vector. For example, in a calculation of obtaining 0-th shadow base vector, $\alpha_0 = (\sqrt{(4\pi)}) \cdot k_0$ is calculated.

Furthermore, $k_n$ ($k_0$ to $k_8$) is calculated by Formula (4) as shown below:

$$k_n = \begin{cases} \dfrac{\sqrt{\pi}}{2} & (n = 0) \\ \sqrt{\dfrac{\pi}{3}} & (n = 1) \\ (-1)^{\frac{n}{2}+1} \dfrac{\sqrt{(2n+1)\pi}}{2n(n-1)} \binom{n}{\frac{n}{2}} & \begin{pmatrix} n \text{ is an} \\ \text{even number} \\ \text{equal to 2} \\ \text{or more} \end{pmatrix} \\ 0 & \begin{pmatrix} n \text{ is an odd} \\ \text{number equal} \\ \text{to 2 or more} \end{pmatrix} \end{cases} \qquad \text{Formula (4)}$$

However, in a formula for "n is an even number equal to 2 or more" in Formula (4), the portion with parentheses shown below means a number of combinations in selecting n/2 elements out of n elements.

$$\binom{n}{\frac{n}{2}}$$

Hence, a value of each $k_n$ is as follows.
$k_0 \approx 0.8862$
$k_1 \approx 1.0233$
$k_2 \approx 0.4954$
$k_4 \approx -0.1108$
$k_6 \approx 0.0499$
$k_8 \approx -0.0285$
$k_3 = k_5 = k_7 = 0$ When calculating the shadow base vector $G_n$, the shadow base calculating unit 3 calculates $\alpha_n$ through a calculation of Formula (3) with using n and $k_n$ corresponding to n.

Furthermore, the shadow base calculating unit 3 calculates $Y_{nm}$ in Formula (2) in a manner as shown by following Formulas (5) to (13) with using vector components of the normal vector $n_i$.

$$Y_{nm} = \frac{1}{\sqrt{4\pi}} \qquad \text{Formula (5)}$$

(when $n = 0$)

$$Y_{nm} = \sqrt{\frac{3}{4\pi}}\, z \qquad \text{Formula (6)}$$

(when $n = 1$)

$$Y_{nm} = \sqrt{\frac{3}{4\pi}}\, x \qquad \text{Formula (7)}$$

(when $n = 2$)

$$Y_{nm} = \sqrt{\frac{3}{4\pi}}\, y \qquad \text{Formula (8)}$$

(when $n = 3$)

$$Y_{nm} = \frac{1}{2}\sqrt{\frac{5}{4\pi}} \qquad \text{Formula (9)}$$

$(3z^2 - 1)$(when $n = 4$)

$$Y_{nm} = 3\sqrt{\frac{5}{12\pi}}\, xz \qquad \text{Formula (10)}$$

(when $n = 5$)

$$Y_{nm} = 3\sqrt{\frac{5}{12\pi}}\, yz \qquad \text{Formula (11)}$$

(when $n = 6$)

$$Y_{nm} = \frac{3}{2}\sqrt{\frac{5}{12\pi}} \qquad \text{Formula (12)}$$

$(x^2 - y^2)$(when $n = 7$)

$$Y_{nm} = 3\sqrt{\frac{5}{12\pi}}\, xy \qquad \text{Formula (13)}$$

(when $n = 8$)

The shadow base calculating unit 3 obtains a normal vector at each point from the three-dimensional shape data and uses components of the normal vector to calculate $Y_{nm}$ for calculating respective vector components of the nine shadow base vectors with using Formulas (5) to (13). Furthermore, the shadow base calculating unit 3 performs a calculation of Formula (3) with using $k_n$ for each shadow base vector to obtain $\alpha_n$ ($\alpha_0$ to $\alpha_8$) corresponding to $G_0$ to $G_8$. The shadow base calculating unit 3 calculates $\alpha_n \cdot Y_{nm}$ for each shadow base vector (see Formula (2)) and performs a calculation of multiplying the result by albedo (see Formula (1)). Note that the albedo is assumed to be 1.0. As a result, there are obtained nine kinds of shadow base vectors $G_0$ to $G_8$ including vector components corresponding to respective pixels.

In this manner, the shadow base calculating unit 3 uses a normal vector at a point of the three-dimensional shape, the point corresponding to a pixel indicated by a vector component of a shadow base vector, to perform calculations which are determined in advance for respective the plurality of shadow based vectors, and thus calculates the calculation result ($\alpha_n \cdot Y_{nm}$) for respective vector components of each shadow base vector. Then, by multiplying the calculation result $\alpha_n \cdot Y_{nm}$ by the uniform albedo (1.0), the nine shadow base vectors are calculated.

Subsequently, the perfect diffuse image estimating unit 4 estimates a shadow in the registration image with using the shadow base vectors and generates the perfect diffuse component image including the shadow (Step S3). The process of Step S3 will be described below in detail.

When certain illumination base vectors are given, an image with a shadow can be represented by a sum of products obtained by multiplying the respective illumination base vectors by factors (assumed to be $\lambda_a, \lambda_b, \lambda_c, \ldots$, in this case). For example, when it is assumed that the respective illumination base vectors are $G_a, G_b, G_c, \ldots$, the image with shadow can be represented by $\Sigma (\lambda_i G_i) = \lambda_a G_a + \lambda_b G_b + \lambda_c G_c + \ldots$.

Since the shadow base vectors are illumination base vectors, by calculating the respective coefficients $\lambda$ to be multiplied to the shadow base vectors, the shadow in the registration image can be estimated. When the registration image is denoted by $I_{reg}$, in an approximation of $I_{reg}$ by a linear combination of the shadow based vector group ($G_0$ to $G_8$ in the present example), a combination of coefficients is obtained by a least square method such that the difference between the approximated result and the registration image is minimized. That is, $\lambda_i$ is obtained by the least square method as below:

$$\lambda_i = \arg\min |I_{reg} - \Sigma(\lambda_i G_i)|$$

Note that $I_{reg}$ is a vector including vector components corresponding to the respective pixels of the registration image and the value of the vector component is a brightness value of the corresponding pixel (the pixel of the registration image). This point is similar to the point that the vector component of the shadow base vector corresponds to the pixel of the image as shown in FIGS. 6A and 6B.

Specifically, the perfect diffuse image estimating unit 4 obtains, through the following calculations, a $\lambda$ group used to represent the shadow in the registration image by the shadow base vectors $G_0$ to $G_8$. When coefficients of the shadow base vectors $G_0$ to $G_8$ are respectively denoted by $\lambda_0$ to $\lambda_8$, a calculation of $\lambda_0 G_0 + \lambda_1 G_1 + \lambda_2 G_2 + \ldots + \lambda_8 G_8$ is represented by $G \cdot \lambda_v$. Note that G is a matrix in which column vectors $G_0$ to $G_8$ are arranged from the left in the order of $G_0$ to $G_8$. $\lambda_v$ is a column vector including $\lambda_0$ to $\lambda_8$ as its vector components. Since $I_{reg}$ is approximated by $G \cdot A_v$, Formula (14) is required to be valid.

$$I_{reg} \approx G \cdot \lambda_v \qquad \text{Formula (14)}$$

The perfect diffuse image estimating unit 4 obtains the $\lambda$ group (i.e., $\lambda_v$) by a calculation of Formula (15) as shown below such that the difference between the registration image $I_{reg}$ and the approximation result (i.e., right side of Formula (14)) is minimized.

$$\lambda_v = G^- \cdot I_{reg} \qquad \text{Formula (15)}$$

$G^-$ is a generalized inverse matrix. The perfect diffuse image estimating unit 4 calculates $G^-$ by Formula (16) as below:

$$G^- = (G^T \cdot G)^{-1} G^T$$

(when a number of rows is larger than a number of columns in G)

$$G^- = G^T (G \cdot G^T)^{-1} \qquad \text{Formula (16)}$$

(when a number of columns is larger than a number of rows in G)

It is noted that, in this example, the number of columns of G is 9 and the number of rows of G is the same as the number of pixels. Therefore, the number of rows is generally larger than the number of columns in G, and when the number of pixels is larger than 9, the generalized inverse matrix is calculated by $G^- = (G^T \cdot G)^{-1} G^T$ as the former formula of Formula (16).

Here, $G^T$ is a transposed matrix of the matrix G.

When $\lambda_v$ is obtained through the calculation of Formula (15) (i.e., when $\lambda_0$ to $\lambda_8$ are obtained), the perfect diffuse image estimating unit 4 obtains a perfect diffuse component image by using the respective shadow base vectors obtained in Step S2 and their coefficients. The perfect diffuse component image is denoted by $I_{est}$. Here, $I_{est}$ is a vector including vector components corresponding to the respective pixels of the perfect diffuse component image, and a value of the vector component is a brightness value of the corresponding pixel (pixel of the perfect diffuse component image). The perfect diffuse image estimating unit 4 calculates $I_{est}$ by using Formula (17) as below. By calculating $I_{est}$, Step S3 ends.

$$I_{est} = G \cdot \lambda_v \qquad \text{Formula (17)}$$

According to the first to fourth assumptions described above, the contour regions and the specular reflection regions in which albedo is uniform occupy small area in the face image, such regions in the face image have a small influence on the estimation of $I_{est}$, and the perfect diffuse component image $I_{est}$ can be estimated by such calculations as mentioned above. In this estimation, it is also possible to use a technique such as robust estimation to exclude contours such as eyes and eyebrows or specular reflection regions as abnormal values. For example, a method called as M estimation, LMedS estimation or RANSAC can be used. Since the robust estimation, M estimation, LMedS estimation and RANSAC are general techniques, their explanations are omitted.

After Step S3, the highlight removing unit 5 compares brightness values of corresponding pixels between the registration image $I_{reg}$ stored in the storage unit 2 and the perfect diffuse component image $I_{est}$ calculated in Step S3. Then, when the difference between the brightness values of the corresponding pixels (specifically, a value obtained by subtracting from a brightness value of a pixel of the registration image $I_{reg}$, a brightness value of the corresponding pixel of the perfect diffuse component image $I_{est}$) is larger than a threshold, the highlight removing unit 5 judges that the pixel is a pixel of a specular reflection region. Then, the highlight removing unit 5 generate an image by replacing the brightness value of the pixel by the brightness value of the pixel of the perfect diffuse component image $I_{est}$ and by using brightness values of pixels of the registration image $I_{reg}$ without replacement for other pixels (Step S4). By this process, there can be obtained an image in which a specular reflection included in the registration image is removed. The image obtained in Step S4 is referred to as highlight removal image $I_{reg}'$.

Brightness values of arbitrary j-th pixels of the images $I_{reg}$, $I_{est}$ and $I_{reg}'$ are denoted by $I_{reg}(j)$, $I_{est}(j)$ and $I_{reg}'(j)$, respectively. And the threshold is denoted by T. The highlight removing unit 5 determines the brightness value $I_{reg}'(j)$ in the highlight removal image in Step S4 as described below. In specific, $I_{reg}'(j)=I_{est}(j)$ is determined in a case that $I_{reg}(j)-I_{est}(j)>T$ is valid, and $I_{reg}'(j)=I_{reg}(j)$ in a case that $I_{reg}(j)-I_{est}(j)>T$ is not valid. The highlight removing unit 5 determines the brightness value for each pixel in this manner. A value of the threshold T is, for example, zero. However, another value can be used as T.

Also, in the following description, "j" in parentheses is used to represent a brightness of an arbitrary j-th pixel in an image in the same manner as above description.

The value of the threshold T may be increased in consideration of an estimation error of $I_{est}$, or a mixture process of brightness values between the registration image $I_{reg}$ and the perfect diffuse component image $I_{est}$ may be performed when $I_{reg}(j)-I_{est}(j)$ is approximate to the value of the threshold T. By performing the mixture process, an appearance of a pseudo contour and the like can be prevented. With respect to whether or not $I_{reg}(j)-I_{est}(j)$ is approximate to the value of the threshold T, for example, a threshold (which is denoted by T') other than the threshold T is determined in advance, the mixture process is performed in the case of $|I_{reg}(j)-I_{est}(j)|<T'$.

The highlight removing unit 5 can determine the brightness value $I_{reg}'(j)$ of the highlight removal image by performing, for example, a mixture process calculation of Formula (18) as below:

$$I_{reg}'(j)=\{1.0-(I_{reg}(j)-I_{est}(j)/I_{max})^\gamma\}\cdot I_{reg}(j)+(I_{reg}(j)-I_{est}(j)/I_{max})^\gamma\cdot I_{est}(j) \quad \text{Formula (18)}$$

$I_{max}$ in Formula (18) is the maximum value of the brightness values of the respective pixels of $I_{reg}$ and $I_{est}$. Furthermore, $\gamma$ in Formula (18) is a variable for varying a mixture ratio nonlinearly. The value of $\gamma$ is not limited in particular and may be appropriately determined depending on a desired degree of the mixing. Furthermore, Formula (18) is an example of the mixture process calculation, the calculation formula for determining the brightness value through the mixture process is not limited to Formula (18), and the highlight removing unit 5 may perform another mixture process calculation.

The highlight removal image obtained as described above is used for calculating illumination base vectors in an image recognition system and the like.

In the image processing device according to the first embodiment of the present invention, the shadow base calculating unit 3 calculates, from a registration image representing a photographed object and three-dimensional shape data in which respective points of a three-dimensional shape of the photographed object are correlated with pixels of the registration image, by assuming uniform albedo, a shadow base vector group having components as vector values from which an image under an arbitrary illumination condition can be generated through a linear combination. The perfect diffuse image estimating unit 4 estimates a shadow in the registration image with using the shadow base vector group and generates a perfect diffuse component image $I_{est}$ including the shadow. Then, the highlight removing unit 5 generates, based on the perfect diffuse component image $I_{est}$, a highlight removal image $I_{reg}'$ as an image for producing illumination base vectors for use in an image recognition process by removing a specular reflection component from the registration image $I_{reg}$. Specifically, in a case that a noted pixel is set for each pixel, when a calculated value obtained by subtracting from a brightness value of a target pixel as a noted pixel out of pixels of the registration image $I_{reg}$, a brightness value of a corresponding pixel corresponding to the target pixel out of pixels of the perfect diffuse component image $I_{est}$ is equal to a threshold or more, the brightness value of the corresponding pixel is used as the brightness value of the noted pixel to generate the highlight removal image $I_{reg}'$; and when the calculated value is smaller than the threshold value, the brightness value of the target pixel is used as the brightness value of the noted pixel to generate the highlight removal image $I_{reg}'$. Thus, the image recognition system generates illumination base vectors from the highlight removal image $I_{reg}'$ and thereby can obtain the illumination base vectors based on which an accurate image recognition process can be carried out without influence of a specular reflection.

(Second Embodiment)

Figure 7:
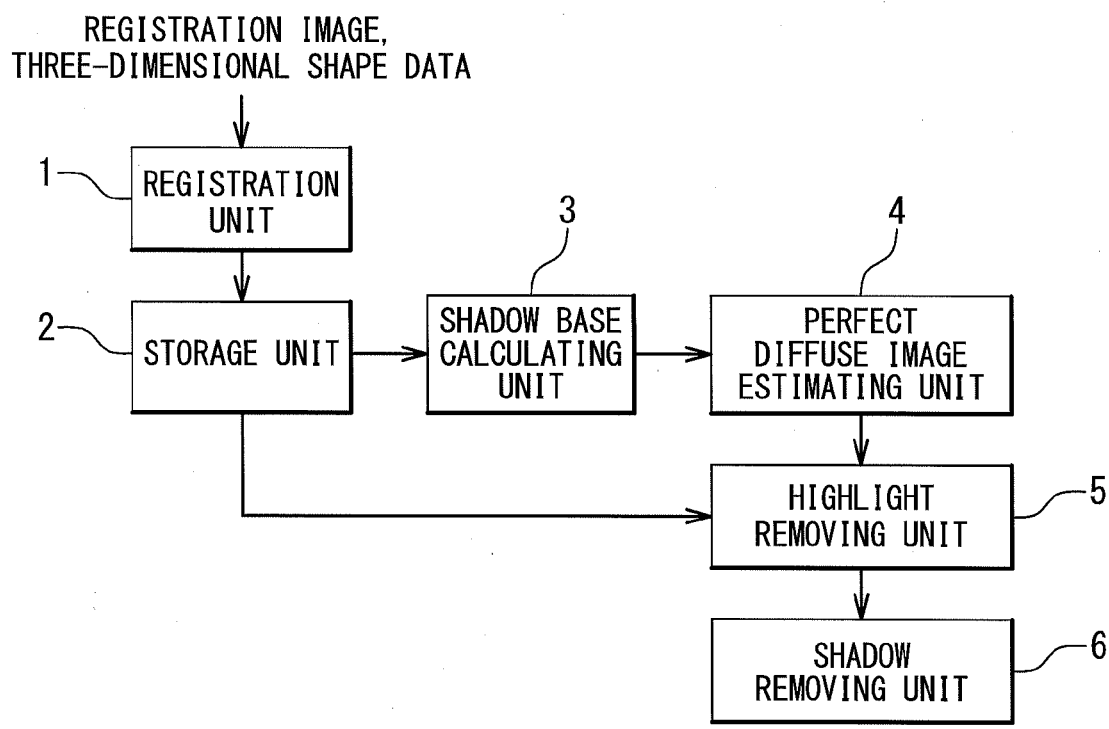
FIG. 7 is a block diagram showing a configuration of an image processing device according to a second embodiment of the present invention.

FIG. 7 is a block diagram showing a configuration of an image processing device according to a second embodiment of the present invention. In the second embodiment, the elements same as those in the first embodiment are designated by the same reference symbols shown in FIG. 3 and their explanations are omitted. The image processing device according to the second embodiment of the present invention further removes a shadow appearing in the highlight removal image from the highlight removal image. The image processing device includes the registration unit 1, the storage unit 2, the shadow base calculating unit 3, the perfect diffuse image estimating unit 4, the highlight removing unit 5 and a shadow removing unit 6.

Operations and functions of the registration unit 1, the storage unit 2, the shadow base calculating unit 3, the perfect diffuse image estimating unit 4 and the highlight removing unit 5 are the same as those in the first embodiment. The shadow removing unit 6 removes a shadow appearing in the highlight removal image. The image obtained by further removing the shadow from the highlight removal image is referred to as a shadow removal image.

The registration unit 1, the shadow base calculating unit 3, the perfect diffuse image estimating unit 4, the highlight removing unit 5 and the shadow removing unit 6 can be implemented as either circuits or a computer program. For example, in the case of hardware, the registration unit 1, the shadow base calculating unit 3, the perfect diffuse image estimating unit 4, the highlight removing unit 5 and the shadow removing unit 6 are circuits or devices. For example, in the case of software, the registration unit 1, the shadow base calculating unit 3, the perfect diffuse image estimating unit 4, the highlight removing unit 5 and the shadow removing unit 6 are a computer program. In this case, the image processing device according to the second embodiment of the present invention is a computer which includes an execution unit (not shown) as a CPU (Central Processing Unit) and the storage unit 2 as a recording medium. The storage unit 2 stores a computer program (image processing program) to be executed by the computer. When the computer is activated, the execution unit reads the computer program from the storage unit 2 and executes the program.

Figure 8:
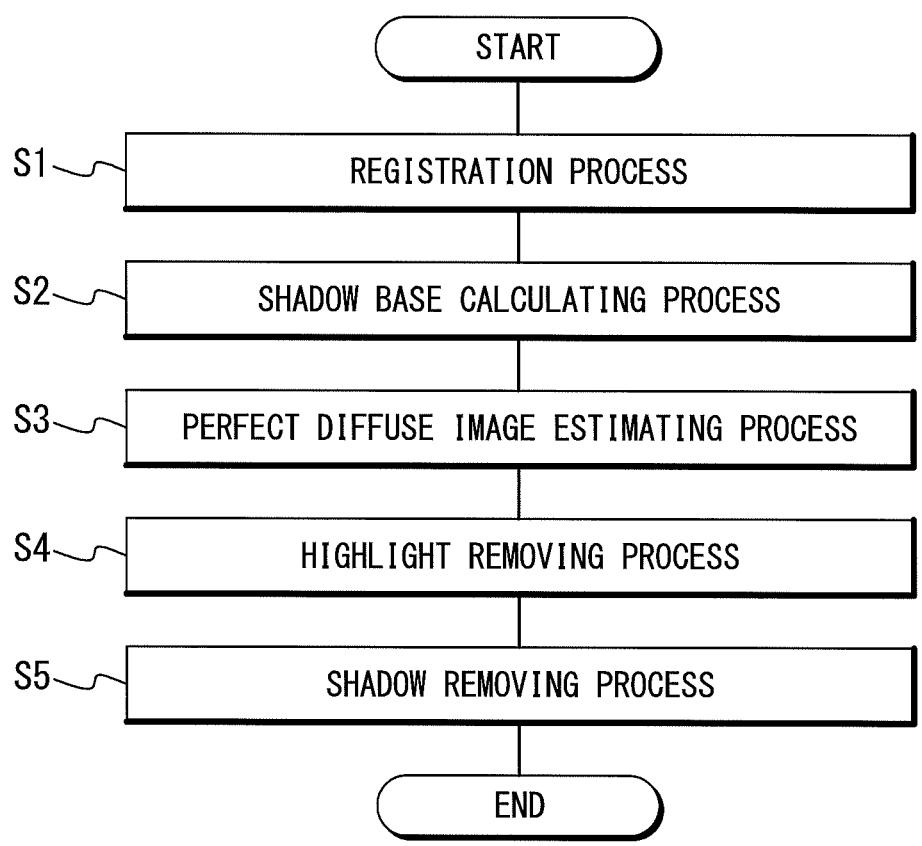
FIG. 8 is a flow chart showing an operation of the image processing device according to the second embodiment of the present invention.

FIG. 8 is a flow chart showing an operation of the image processing device according to the second embodiment of the present invention. The operations in Steps S1 to S4 are same as those in the first embodiment and their explanations are omitted. Operations after the highlight removal image is generated in Step S4 are described below.

After Step S4, the shadow removing unit 6 removes a shadow from the highlight removal image $I_{reg}'$ to generate a shadow removal image (Step S5). The process in Step S5 is described below.

In the right side of Formula (17), G is a matrix in which column vectors $G_0$ to $G_8$ are arranged from the left in the order of $G_0$ to $G_8$. $\lambda_v$ is a column vector including $\lambda_0$ to $\lambda_8$ as its vector components. Therefore, the right side of Formula (17) can be represented by Formula (19) as below:

$$\lambda_0 \cdot G_0 + \lambda_1 \cdot G_1 + \lambda_2 \cdot G_2 + \ldots + \lambda_8 \cdot G_8 \quad \text{Formula (19)}$$

In Formula (19), $\lambda_0 \cdot G_0$ is denoted by $I_{base}$ and $\lambda_1 \cdot G_1 + \lambda_2 \cdot G_2 + \ldots + \lambda_8 \cdot G_8$ is denoted by $I_{shade}$. Then, Formula (19) can be represented by $I_{base} + I_{shade}$.

Furthermore, the shadow base vector $G_0$ corresponds to brightness values of the image photographed under a uniform illumination condition.

At this time, $I_{reg}'(j)$ can be represented by Formula (20) as below:

$$I_{reg}'(j) = (I_{base}(j) + I_{shade}(j)) * A_1 \quad \text{Formula (20)}$$

Here, $A_1$ is albedo. $I_{reg}'(j)$, $I_{base}(j)$ and $I_{shade}(j)$ are brightness of arbitrary j-th pixels in the respective images.

The shadow removing unit 6 performs a calculation of the following Formula (21) for each pixel to calculate a brightness value of the pixel and thereby can obtain the shadow removal image (which is noted by $I_{reg}''$). Here, $I_{reg}''(j)$ is a brightness of an arbitrary j-th pixel in the shadow removal image $I_{reg}''$.

$$I_{reg}''(j) = I_{reg}'(j)/(I_{base}(j) + I_{shade}(j)) \quad \text{Formula (21)}$$

More specifically, the shadow removing unit 6 calculates a product of a vector component of the shadow base vector ($G_0$ to $G_8$) and the coefficient ($\lambda_0$ to $\lambda_8$) corresponding to the shadow base vector for each pixel (in other words, for each j) and calculates a sum of the products obtained for the respective shadow base vectors. The calculation result is $I_{base}(j) + I_{shade}(j)$ as described above. Then, the shadow removing unit 6 executes a process of dividing the brightness value $I_{reg}'(j)$ of the highlight removal image obtained by the highlight removing unit 5 by the above result $I_{base}(j) + I_{shade}(j)$ for each pixel to thereby determine brightness values of the respective pixels of the shadow removal image. Thus, by determining the brightness values of the respective pixels, the shadow removal image is generated.

Alternatively, the shadow removing unit 6 may determine each brightness value of the shadow removal image as a product of $I_{base}(j)$ and the value obtained by the calculation of Formula (21) as described above. That is, the shadow removal image can be generated by executing a calculation of the following Formula (21) for each pixel (i.e., for each j) to thereby obtain brightness values of the respective pixels.

$$I_{reg}''(j) = I_{reg}'(j)/(I_{base}(j) + I_{shade}(j)) \times I_{base}(j) \quad \text{Formula (22)}$$

Here, $I_{base}(j)$ is a result obtained by multiplying vector components of the first shadow base vector $G_0$ by the coefficient $\lambda_0$ corresponding to the shadow base vector $G_0$.

The shadow removal image obtained as described above is used to calculate illumination base vectors in an image recognition system and the like.

Although the registration image $I_{reg}$ inputted to the registration unit 1 is an image photographed under the illumination condition as uniform as possible, a shadow may appear in the image. According to the image processing device in the second embodiment of the present invention, first, as same as the first embodiment, the highlight removal image can be obtained in which the specular reflection component is removed from the registration image. Next, the shadow removing unit 6 uses the highlight removal image to obtain brightness values by executing the calculation of Formula (21) for the respective pixels and thereby generates the shadow removal image in which the shadow is removed from the highlight removal image. Specifically, the shadow removing unit 6 obtains a product of a vector component of the shadow base vector and the coefficient corresponding to the shadow base vector for each pixel, calculates a sum of the products, and generates the shadow removal image of which a brightness value is a value obtained by dividing a brightness value of a pixel of the highlight removal image by the above sum. Therefore, the image recognition system generates illumination base vectors from the shadow removal image and thereby can obtain the illumination base vectors based on which an accurate image recognition process can be carried out without influence of not only a specular reflection but also a shadow in the registration image $I_{reg}$.

(Third Embodiment)

Figure 9:
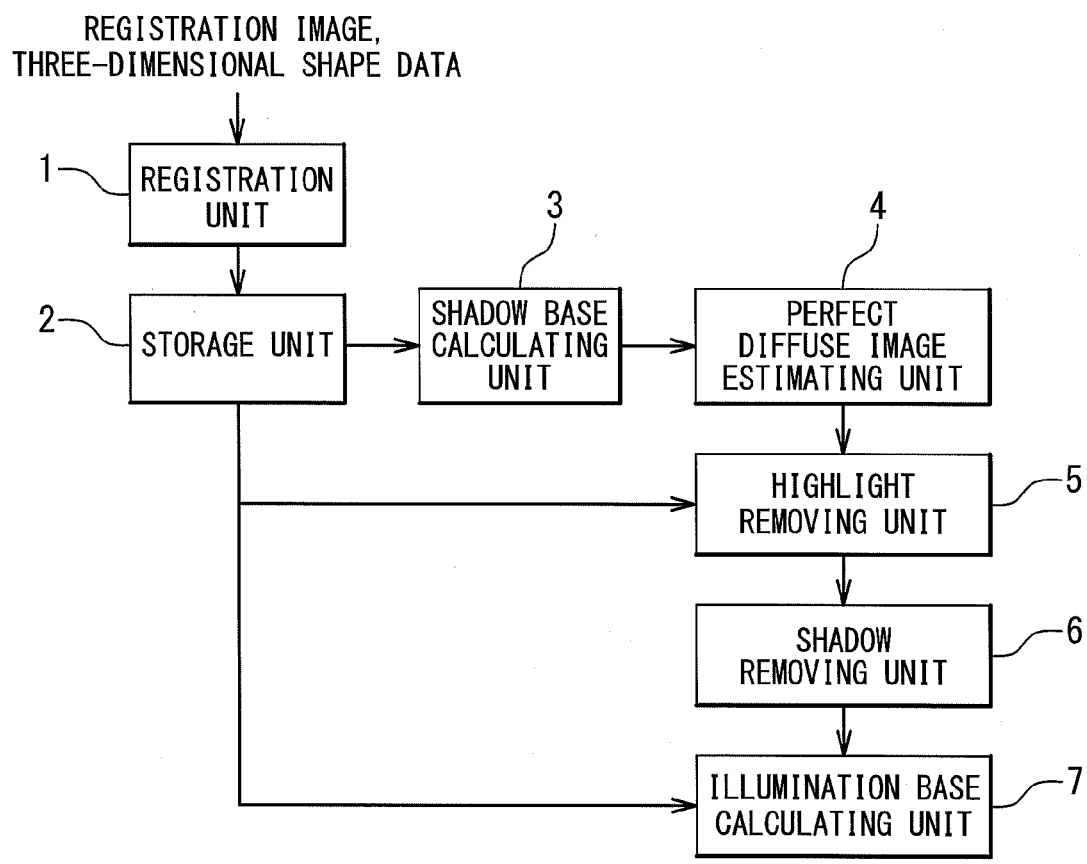
FIG. 9 is a block diagram showing a configuration of an image processing device according to a third embodiment of the present invention.

FIG. 9 is a block diagram showing a configuration of an image processing device according to a third embodiment of the present invention. In the third embodiment, the elements same as those in the first and second embodiments are designated by the same reference symbols shown in FIGS. 3 and 7 and their explanations are omitted. The image processing device according to the third embodiment of the present invention generates illumination base vectors from an image obtained by removing a specular reflection component from the registration image $I_{reg}$. Since the shadow base vectors calculated by the shadow base calculating unit 3 are also illumination base vectors, the illumination base vectors generated from the image in which the specular reflection component is removed is referred to as non-specular reflection (free from specular reflection, i.e., specularity-free) illumination base vectors in order to distinguish the vectors from the shadow base vectors. The image processing device includes the registration unit 1, the storage unit 2, the shadow base calculating unit 3, the perfect diffuse image estimating unit 4, the highlight removing unit 5, the shadow removing unit 6 and an illumination base calculating unit 7.

Operations and functions of the registration unit 1, the storage unit 2, the shadow base calculating unit 3, the perfect diffuse image estimating unit 4, the highlight removing unit 5 and the shadow removing unit 6 are the same as those in the second embodiment. The illumination base calculating unit 7 generates illumination base vectors (non-specular reflection illumination base vectors) from the image in which the specular reflection component is removed from the registration image.

The registration unit 1, the shadow base calculating unit 3, the perfect diffuse image estimating unit 4, the highlight removing unit 5, the shadow removing unit 6 and the illumination base calculating unit 7 can be implemented as either circuits or a computer program. For example, in the case of hardware, the registration unit 1, the shadow base calculating unit 3, the perfect diffuse image estimating unit 4, the highlight removing unit 5, the shadow removing unit 6 and the illumination base calculating unit 7 are circuits or devices. For example, in the case of software, the registration unit 1, the shadow base calculating unit 3, the perfect diffuse image estimating unit 4, the highlight removing unit 5, the shadow removing unit 6 and the illumination base calculating unit 7 are a computer program. In this case, the image processing device according to the third embodiment of the present invention is a computer which includes an execution unit (not shown) as a CPU (Central Processing Unit) and the storage unit 2 as a recording medium. The storage unit 2 stores a computer program (image processing program) to be executed by the computer. When the computer is activated, the execution unit reads the computer program from the storage unit 2 and executes the program.

Figure 10:
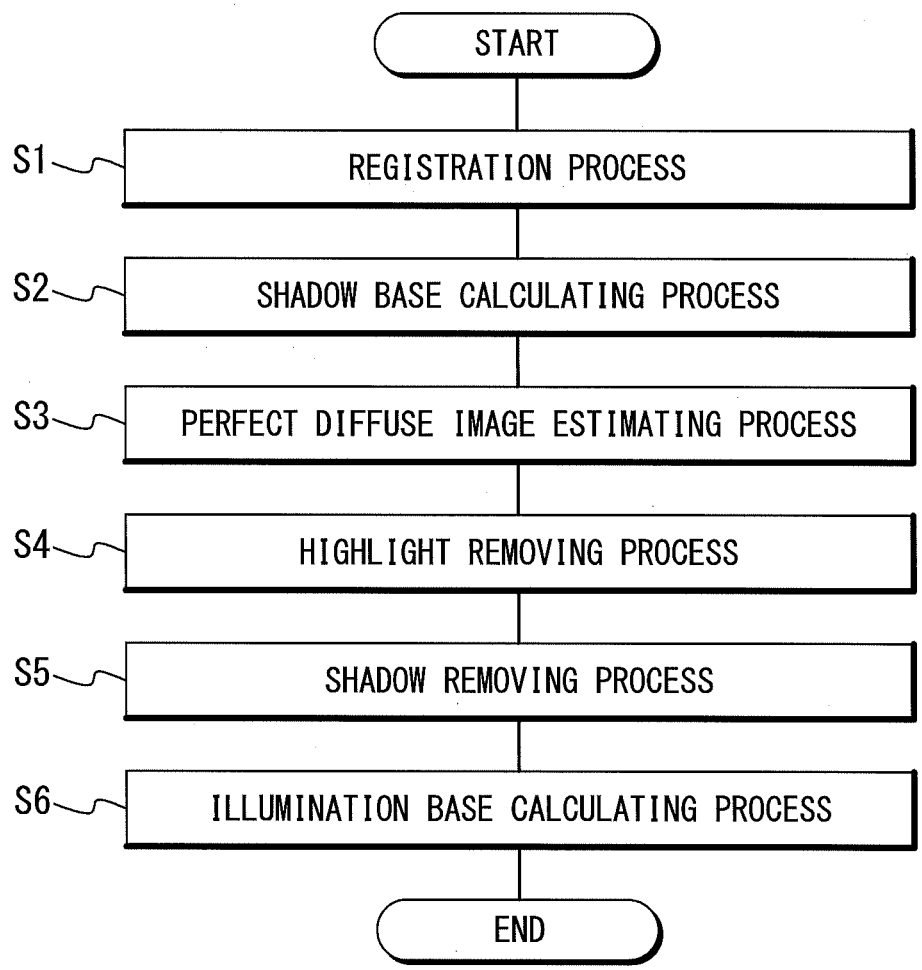
FIG. 10 is a flow chart showing an operation of the image processing device according to the third embodiment of the present invention.

FIG. 10 is a flowchart showing an operation of the image processing device according to the third embodiment of the present invention. The operations in Steps S1 to S5 are same as those in the second embodiment and their explanations are omitted. Here, by using the shadow removal image obtained in Step S5 as the image in which the specular reflection component is removed from the registration image, an example is described in which the non-specular reflection base vectors are generated from the shadow removal image.

When the shadow removal image is generated by the shadow removing unit 6, the illumination base calculating unit 7 calculates illumination base vectors by using brightness values of respective pixels of the shadow removal image in place of albedo (Step S6). The illumination base vectors obtained as a result are the non-specular reflection base vectors. In the present embodiment, an example is described in which nine non-specular reflection base vectors are generated as same as the shadow base vectors. These nine non-specular reflection base vectors are denoted by $V_0$ to $V_8$.

In a generating process of the non-specular reflection base vectors, brightness values of respective pixels of the shadow removal image are used as albedo in Formula (1). The other points are same as those of the calculating process of the shadow base vectors. Specifically, the illumination base calculating unit 7 obtains a normal vector at each point from the three-dimensional shape data and calculates $Y_{nm}$ for calculating each vector component of the nine non-specular reflection base vectors by using the components of the normal vector and Formulas (5) to (13). Furthermore, the illumination base calculating unit 7 uses $k_n$ (see Formula (4)) for each non-specular reflection base vector to execute the calculation of Formula (3) and thereby obtains $\alpha_n$ ($\alpha_0$ to $\alpha_8$) corresponding to $V_0$ to $V_8$. Then, the illumination base calculating unit 7 calculates $\alpha_n \cdot Y_{nm}$ for each non-specular reflection base vector (see Formula (2)). Then, $\alpha_n \cdot Y_{nm}$ obtained for each pixel with respect to $V_0$ to $V_8$ is multiplied by the brightness value of the corresponding pixel of the shadow removal image as the albedo and thereby values of the respective vector components of each of the non-specular reflection base vectors $V_0$ to $V_8$ are determined.

The illumination base calculating unit 7 stores the non-specular reflection base vectors calculated as described above in the storage unit 2.

It is noted that the value of $\alpha_n \cdot Y_{nm}$ obtained for each pixel with regard to the respective illumination base vectors is identical to $\alpha_n \cdot Y_{nm}$ in the calculation of the shadow base vectors. Hence, $V_0$ to $V_8$ may be calculated with using $\alpha_n \cdot Y_{nm}$ calculated by the shadow base calculating unit 3.

In the above description, an example is described in which the shadow removal image is used to calculate the non-specular reflection base vectors, however, the highlight removal image generated in Step 4 can be used to calculate the non-specular reflection base vectors. In this case, a brightness value of a pixel of the highlight removal image can be used as albedo. That is, the illumination base calculating unit 7 may determine the values of the respective vector components of each of the non-specular reflection base vectors $V_0$ to $V_8$ by multiplying $\alpha_n \cdot Y_{nm}$ obtained for each pixel with respect to $V_0$ to $V_8$ by the brightness value of the corresponding pixel of the highlight removal image as albedo. In this case, the image processing device is not required to include the shadow removing unit 6 and the process of Step S5 can be omitted.

According to the image processing device in the third embodiment of the present invention, first, as same as the first embodiment, the highlight removal image can be obtained in which the specular reflection component is removed from the registration image. Next, the illumination base calculating unit 7 uses a brightness value of a pixel of the highlight removal image as albedo to calculate the non-specular reflection base vector of which a component is a brightness value of a pixel of the registration image for each pixel from the three-dimensional shape data. Alternatively, first, as same as the first embodiment, the highlight removal image can be obtained in which the specular reflection component is removed from the registration image. Next, as same as the second embodiment, the shadow removal image can be obtained in which the shadow is removed from the highlight removal image. Next, the illumination base calculating unit 7 uses a brightness value of a pixel of the shadow removal image as albedo to calculate the non-specular reflection base vector of which a component is a brightness value of a pixel of the registration image for each pixel from the three-dimensional shape data. In this way, according to the image processing device in the third embodiment of the present invention, the illumination base vectors are generated from the image in which the specular reflection is removed from the inputted registration image. Therefore, there can be obtained the illumination base vectors without influence of the specular reflection in the registration image. When the shadow removal image is used, there can be obtained the illumination base vectors without influences of not only the specular reflection but also the shadow in the registration image.

(Fourth Embodiment)

Figure 11:
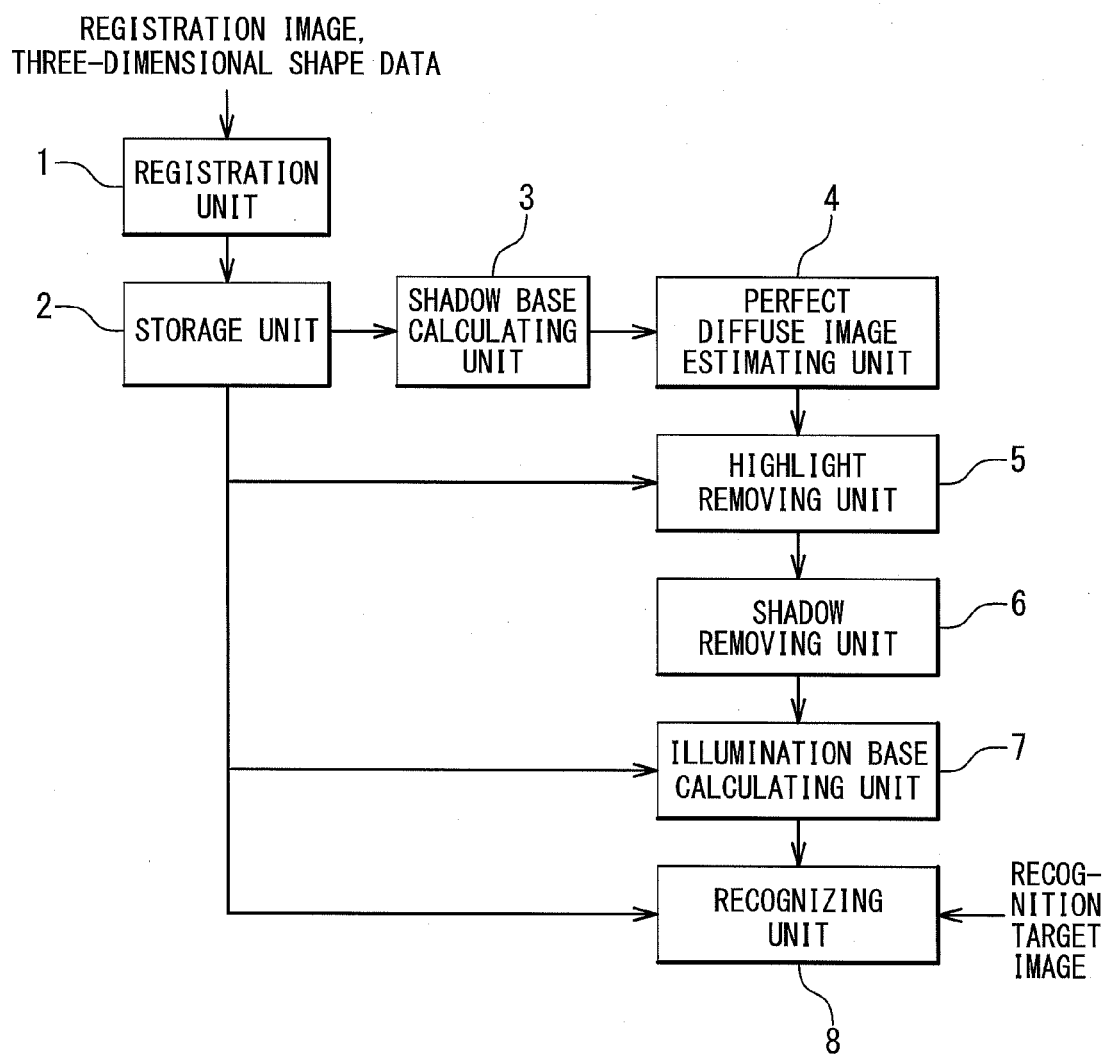
FIG. 11 is a block diagram showing a configuration of an image processing device according to a fourth embodiment of the present invention.

FIG. 11 is a block diagram showing a configuration of an image processing device according to a fourth embodiment of the present invention. In the fourth embodiment, the elements same as those in the first to third embodiments are designated by the same reference symbols as shown in FIGS. 3, 7 and 9 and their explanations are omitted. When a recognition target image as a recognition target is inputted, the image processing device according to the fourth embodiment of the present invention executes a process of judging whether or not a photographed object (face) represented by the recognition target image corresponds to a face of a person represented by the registration image. The image processing device includes the registration unit 1, the storage unit 2, the shadow base calculating unit 3, the perfect diffuse image estimating unit 4, the highlight removing unit 5, the shadow removing unit 6, the illumination base calculating unit 7 and a recognizing unit 8.

Operations and functions of the registration unit 1, the storage unit 2, the shadow base calculating unit 3, the perfect diffuse image estimating unit 4, the highlight removing unit 5, the shadow removing unit 6 and the illumination base calculating unit 7 are the same as those in the third embodiment. When the recognition target image is inputted, the recognition unit 8 executes an authentication with respect to the recognition target image by using the non-specular reflection base vectors calculated by the illumination base calculating unit 7. That is, it is judged whether or not the face photographed in the recognition target image corresponds to the face of the person represented by the registration image based on which the non-specular reflection base vectors are generated.

The registration unit 1, the shadow base calculating unit 3, the perfect diffuse image estimating unit 4, the highlight removing unit 5, the shadow removing unit 6, the illumination base calculating unit 7 and the recognizing unit 8 can be implemented as either circuits or a computer program. For example, in the case of hardware, the registration unit 1, the shadow base calculating unit 3, the perfect diffuse image estimating unit 4, the highlight removing unit 5, the shadow removing unit 6, the illumination base calculating unit 7 and the recognizing unit 8 are circuits or devices. For example, in the case of software, the registration unit 1, the shadow base calculating unit 3, the perfect diffuse image estimating unit 4, the highlight removing unit 5, the shadow removing unit 6, the illumination base calculating unit 7 and the recognizing unit 8 are a computer program. In this case, the image processing device according to the fourth embodiment of the present invention is a computer which includes an execution unit (not shown) as a CPU (Central Processing Unit) and the storage unit 2 as a recording medium. The storage unit 2 stores a computer program (image processing program) to be executed by the computer. When the computer is activated, the execution unit reads the computer program from the storage unit 2 and executes the program.

FIG. 12 is a flow chart showing an operation of the image processing device according to the fourth embodiment of the present invention. The operations in Steps S1 to S6 are same as those in the third embodiment. It is noted that, as described in the third embodiment, the non-specular reflection base vectors may be calculated from the highlight removal image without executing Step S5.

In the following example, a case is described in which the nine non-specular reflection base vectors $V_0$ to $V_8$ are calculated as same as the shadow base vectors.

After the illumination base calculating unit 7 calculates the non-specular reflection base vectors, when the recognition target image is inputted (Yes in Step S7), the recognizing unit 8 executes Step S8. Whereas, when the recognition target image is not inputted (No in Step S7), the recognizing unit 8 waits until the recognition target image is inputted.

In Step S8, the recognizing unit 8 executes an authentication of the recognition target image by using the non-specular reflection base vectors. The process of Step S8 can be performed, for example, by a method described below.

It is provided that $\lambda$ as coefficients of the non-specular reflection base vectors $V_0$ to $V_8$ are respectively denoted by $\lambda_{10}$ to $\lambda_{18}$, a calculation of $\lambda_{10}V_0 + \lambda_{11}V_1 + \lambda_{12}V_2 + \ldots + \lambda_{18}V_8$ is represented by $V \cdot \lambda_v'$. Here, V is a matrix in which the column vectors $V_0$ to $V_8$ are arranged from the left in the order of $V_0$ to $V_8$. $\lambda_v'$ is a column vector of which vector components are $\lambda_{10}$ to $\lambda_{18}$.

In a case that the recognition target image (denoted by $I_{in}$) is approximated by $V \cdot \lambda_v'$ with using the non-specular reflection base vectors, it is required that the following Formula (23) is valid.

$$I_{in} \approx V \cdot \lambda_v' \qquad \text{Formula (23)}$$

Herein, $I_{in}$ is a column vector of which vector components are brightness values of the respective pixels of the recognition target image. The recognizing unit 8 calculates a coefficient group $\lambda_v'$ (i.e., $\lambda_{10}$ to $\lambda_{18}$) for representing the recognition target image by the non-specular reflection base vectors, based on the following Formula (24).

$$\lambda_v' = V^- I_{in} \qquad \text{Formula (24)}$$

Here, $V^-$ is a generalized inverse matrix of the matrix V The recognizing unit 8 calculates $V \cdot \lambda_v'$ with using the coefficient group $\lambda_v'$ (i.e., $\lambda_{10}$ to $\lambda_{18}$) obtained in this manner and the non-specular reflection base vectors $V_0$ to $V_8$ and thereby obtains an approximate image of the recognition target image. Then, the recognizing unit 8 calculates a difference between a brightness value of the approximate image and a brightness value of the recognition target image which is actually inputted. When the difference is equal to or smaller than a reference value, it is judged that the face represented by the recognition target image corresponds to the face represented by the registration image based on which the non-specular reflection base vectors are generated. When the difference between the brightness value of the approximate image of the recognition target image and the brightness value of the recognition target image which is actually imputed exceeds the reference value, it is judged that the face represented by the recognition target image does not correspond to the face represented by the registration image.

Also, the recognizing unit 8 can use another method to execute the recognition process with respect to the recognition target image. For example, a method described in Non-Patent Literature 6 can be used to execute the image recognition with respect to the recognition target image. An image recognition process in this case is described. When the method described in Non-Patent Literature 6 is used to execute the image recognition, the recognizing unit 8 executes the image recognition without using the non-specular reflection base vectors. When the recognition target image is inputted, the recognizing unit 8 matches the highlight removal image generated by the highlight removing unit 5 and the recognition target image to judge whether or not the face represented by the recognition target image corresponds to the face of the registration image.

In this case, a discriminant space in a multiclass discriminant analysis in which a person corresponds to a class and a feature vector representing an average face referred to as "standard person" are determined in advance. The feature vector of the standard person is obtained from a distribution of feature vectors of persons used in learning. The recognizing unit 8 normalizes a size of a face in the highlight removal image to generate a perturbed image of the highlight removal image. The perturbed image is an image in which an orientation of a photographed object (face) or a light source lighting the photographed object is varied. The recognizing unit 8 projects the perturbed image to the discriminant space obtained by the multiclass discriminant analysis. Next, the recognizing unit 8 performs a two-class discriminant analysis with respect to the standard person. By performing the processes mentioned above, it is judged whether or not the face represented by the recognition target image corresponds to the face of the registration image.

According to the image processing device in the fourth embodiment of the present invention, first, as same as the first embodiment, the highlight removal image can be obtained in which the specular reflection component is removed from the registration image. Next, as same as the third embodiment, brightness values of the pixels of the highlight removal image are used as albedo to calculate, from the three-dimensional shape data, the non-specular reflection base vector of which a component is a brightness value of a pixel of the registration image for each pixel. Next, when the recognition target image representing the photographed object is given, the recognizing unit 8 uses the non-specular reflection base vectors to match the registration image and the recognition target image, and thereby judges whether or not the photographed object represented by the recognition target image corresponds to the photographed object represented by the registration image. Alternatively, first, as same as the first embodiment, the highlight removal image can be obtained in which the specular reflection component is removed from the registration image. Next, as same as the second embodiment, the shadow removal image can be obtained in which the shadow is removed from the highlight removal image. Next, as same as the third embodiment, brightness values of the pixels of the shadow removal image are used as albedo to calculate the non-specular reflection base vector of which a component is a brightness value of a pixel of the registration image for each pixel, from the three-dimensional shape data. Next, when the recognition target image representing the photographed object is given, the recognizing unit 8 uses the non-specular reflection base vectors to match the registration image and the recognition target image and thereby judges whether or not the photographed object represented by the recognition target image corresponds to the photographed object represented by the registration image. In this manner, the image processing device according to the fourth embodiment of the present invention uses the image in which the specular reflection is removed from the registration image to generate illumination base vectors (non-specular reflection base vectors) and uses the illumination base vectors to execute the image authentication with respect to the authentication target image. Accordingly, an accurate image authentication can be carried out without influence of the specular reflection which appears in the registration image. Moreover, when the shadow removal image, which is generate in Step S5, is used as the image in which the specular reflection is removed from the registration image to generate the illumination base vectors from the shadow removal image, the image authentication process can be carried out without influence of the shadow which appears in the registration image.

As described above, the present invention has been described in referring to the embodiments, however, the present invention is not limited to the above embodiments. Various modifications understandable for those skilled in the art can be applied to the configuration and details of the present invention within the scope of the present invention.

This application is based upon and claims the benefit of priority from Japanese patent application No. 2008-226002, filed on Sep. 3, 2008, the disclosure of which is incorporated herein in its entirety by reference.

The invention claimed is:

1. An image processing device comprising:
   a shadow base calculating unit configured to calculate, from a registration image representing a photographed object and three-dimensional shape data in which respective points of a three-dimensional shape of said photographed object are correlated with pixels of said registration image, by assuming uniform albedo, a shadow base vector group having components as vector values from which an image under an arbitrary illumination condition can be generated through a linear combination;
   a perfect diffuse image estimating unit configured to estimate a shadow in said registration image with using said shadow base vector group and generate a perfect diffuse component image as an image including said shadow; and
   a highlight removing unit configured to generate, based on said perfect diffuse component image, a highlight removal image in which a specular reflection component is removed from said registration image.

2. The image processing device according to claim 1, wherein in a case that a noted pixel is set for each pixel, when a calculated value obtained by subtracting from a brightness value of a target pixel as said noted pixel out of pixels of said registration image, a brightness value of a corresponding pixel corresponding to said target pixel out of pixels of said perfect diffuse component image is equal to a threshold or more, said highlight removing unit uses said brightness value of said corresponding pixel as a brightness value of said noted pixel to generate said highlight removal image, when said calculated value is smaller than said threshold, said highlight removing unit uses said brightness value of said target pixel as a brightness value of said noted pixel to generate said highlight removal image.

3. The image processing device according to claim 1, further comprising a shadow removing unit configured to a shadow removal image in which a shadow is removed from said highlight removal image.

4. The image processing device according to claim 3, wherein said shadow removing unit obtains products of vector components of said shadow base vector group and coefficients corresponding to said shadow base vector group for respective pixels, calculates a sum of said products, and generates said shadow removal image of which a brightness value is a value obtained by dividing a brightness value of a pixel of said highlight removal image by said sum.

5. The image processing device according to claim 3, further comprising an illumination base calculating unit configured to use a brightness value of a pixel of said shadow removal image as albedo to calculate a non-specular reflection illumination base vector of which a component is a brightness value of a pixel of said registration image for each pixel, from said three-dimensional shape data.

6. The image processing device according to claim 1, further comprising an illumination base calculating unit configured to use a brightness value of a pixel of said highlight removal image as albedo to calculate a non-specular reflection illumination base vector of which a component is a brightness value of a pixel of said registration image for each pixel, from said three-dimensional shape data.

7. The image processing device according to claim 6, further comprising a recognizing unit configured to, when a recognition target image representing a photographed object is given. use said non-specular reflection illumination base vector to match said registration image and said recognition target image and thereby judge whether or not said photographed object represented by said recognition target image corresponds to said photographed object represented by said registration image.

8. The image processing device according to claim 1, wherein said three-dimensional shape data represents an average shape of said photographed object.

9. An image processing method comprising:
   calculating, from a registration image representing a photographed object and three-dimensional shape data in which respective points of a three-dimensional shape of said photographed object are correlated with pixels of said registration image, by assuming uniform albedo, a shadow base vector group as a vector group having components as vector values from which an image under an arbitrary illumination condition can be generated through a linear combination;
   generating a perfect diffuse component image as an image including a shadow by estimating said shadow in said registration image with using said shadow base vector group; and
   generating, based on said perfect diffuse component image, a highlight removal image in which a specular reflection component is removed from said registration image.

10. The image processing method according to claim 9, wherein in said generating said highlight removal image, in a case that a noted pixel is set for each pixel, when a calculated value obtained by subtracting from a brightness value of a target pixel as said noted pixel out of pixels of said registration image, a brightness value of a corresponding pixel corresponding to said target pixel out of pixels of said perfect diffuse component image is equal to a threshold or more, said brightness value of said corresponding pixel is used as a brightness value of said noted pixel to generate said highlight removal image, when said calculated value is smaller than said threshold, said brightness value of said target pixel is used as a brightness value of said noted pixel to generate said highlight removal image.

11. The image processing method according to claim 9, further comprising generating a shadow removal image in which a shadow is removed from said highlight removal image.

12. The image processing method according to claim 11, wherein in said generating said shadow removal image, products of vector components of said shadow base vector group and coefficients corresponding to said shadow base vector group are obtained for respective pixels, a sum of said products is calculated, and said shadow removal image is generated of which a brightness value is a value obtained by dividing a brightness value of a pixel of said highlight removal image by said sum.

13. The image processing method according to claim 11, further comprising calculating, by using a brightness value of a pixel of said shadow removal image as albedo, a non-specular reflection illumination base vector of which a component is a brightness value of a pixel of said registration image for each pixel, from said three-dimensional shape data.

14. The image processing method according to claim 9, further comprising calculating, by using a brightness value of a pixel of said highlight removal image as albedo, a non-specular reflection illumination base vector of which a component is a brightness value of a pixel of said registration image for each pixel, from said three-dimensional shape data.

15. The image processing method according to claim 14, further comprising judging, when a recognition target image representing a photographed object is given, whether or not said photographed object represented by said recognition target image corresponds to said photographed object represented by said registration image, by matching said registration image and said recognition target image with using said non-specular reflection illumination base vector.

16. A computer-readable storage medium as a non-transitory tangible medium, storing a computer program for causing a computer executing the instructions to perform an image processing method, wherein the image processing method comprises:

calculating, from a registration image representing a photographed object and three-dimensional shape data in which respective points of a three-dimensional shape of said photographed object are correlated with pixels of said registration image, by assuming uniform albedo, a shadow base vector group as a vector group having components as vector values from which an image under an arbitrary illumination condition can be generated through a linear combination;

generating a perfect diffuse component image as an image including a shadow by estimating said shadow in said registration image with using said shadow base vector group; and generating, based on said perfect diffuse component image, a highlight removal image in which a specular reflection component is removed from said registration image.

* * * * *